(12) United States Patent
Shinoda et al.

(10) Patent No.: US 7,420,888 B2
(45) Date of Patent: Sep. 2, 2008

(54) OPTICAL RECORDING MEDIUM AND OPTICAL RECORDING/REPRODUCING METHOD

(75) Inventors: Masataka Shinoda, Kanagawa (JP); Kimihiro Saito, Saitama (JP)

(73) Assignee: Sony Corporation, Tokyo (JP)

( * ) Notice: Subject to any disclaimer, the term of this patent is extended or adjusted under 35 U.S.C. 154(b) by 303 days.

(21) Appl. No.: 10/465,327

(22) Filed: Jun. 19, 2003

(65) Prior Publication Data
US 2004/0037205 A1 Feb. 26, 2004

(30) Foreign Application Priority Data
Jun. 28, 2002 (JP) ............... 2002-190873
Apr. 18, 2003 (JP) ............... 2003-114859

(51) Int. Cl.
*G11B 11/00* (2006.01)
(52) U.S. Cl. .................. 369/13.33; 369/13.35
(58) Field of Classification Search .......... None
See application file for complete search history.

(56) References Cited

U.S. PATENT DOCUMENTS

| | | | | |
|---|---|---|---|---|
| 4,202,928 | A | * | 5/1980 | Staebler ............... 428/446 |
| 5,878,022 | A | * | 3/1999 | Okada et al. ........... 369/275.4 |
| 6,061,322 | A | * | 5/2000 | Jain et al. ............. 369/99 |
| 6,683,846 | B2 | * | 1/2004 | Kishima et al. .......... 369/286 |
| 6,839,306 | B1 | * | 1/2005 | Hajjar ................ 369/13.33 |
| 6,845,066 | B1 | * | 1/2005 | Shingo ................ 369/44.23 |
| 7,106,524 | B2 | * | 9/2006 | Song ................. 359/719 |
| 2002/0054974 | A1 | * | 5/2002 | Takahashi et al. ......... 428/64.4 |
| 2003/0118936 | A1 | * | 6/2003 | Okubo ................ 430/270.12 |

FOREIGN PATENT DOCUMENTS

| | | |
|---|---|---|
| WO | WO 98/49675 | 11/1998 |
| WO | WO 99/23646 | 5/1999 |

OTHER PUBLICATIONS

Hendren, W. R. Optical and magneto-optical characterization of TbFeCo and GdFeCo thin films for high density recording, Feb. 24, 2003, IOP Publishing Ltd, 15, 1461-1468.*

Milster, Tom D., "Chromatic Correction of High-Performance Solid Immersion Lens Systems", Jpn. J. Appl. Phys., vol. 38, pp. 1777-1779, Mar. 1999.

* cited by examiner

*Primary Examiner*—Joseph Feild
*Assistant Examiner*—Tawfik Goma
(74) *Attorney, Agent, or Firm*—Robert J. Depke; Rockey, Depke & Lyons, LLC

(57) ABSTRACT

An optical recording medium 10 on which recording/reproducing or reproducing is performed by irradiating a light by means of an objective lens 4 having a numerical aperture equal to or more than 1 wherein an optical recording portion 2 is provided at least at the outer most surface at the irradiation side of the optical recording medium 10 and a relation $n \geq NA$ is selected when the refractive index of the recording portion 2 is n and the numerical aperture of the objective lens 4 is NA. Accordingly, it can propose an optical recording medium and an optical recording/reproducing method suitable for a near-field optical recording method which uses an objective lens having a numerical aperture equal to or more than 1.

2 Claims, 13 Drawing Sheets n < NA n ≧ NA

FIG. 17A
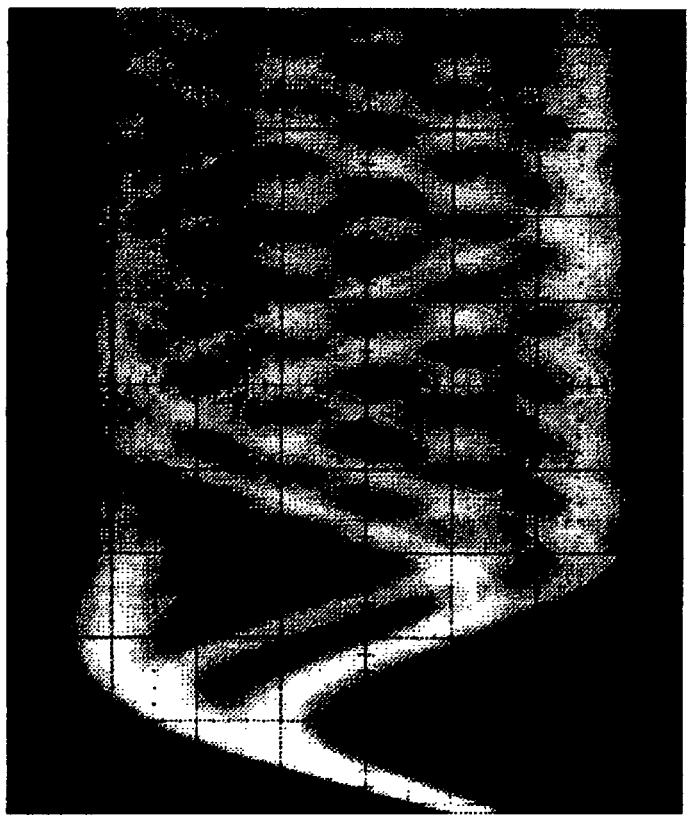
Optical Recording Medium by Glass
FIG. 17B
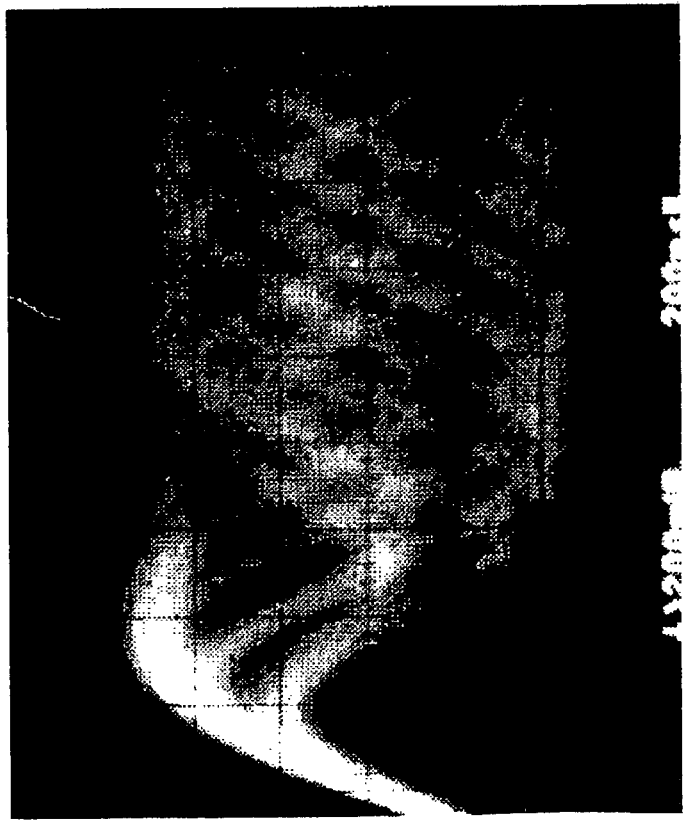
Optical Recording Medium by Sylicon

OPTICAL RECORDING MEDIUM AND OPTICAL RECORDING/REPRODUCING METHOD

This application claims priority to Japanese Patent Application Numbers JP2002-190873 filed Jun. 28, 2002 and JP2003-114859 Apr. 18, 2003 which are incorporated herein by reference.

BACKGROUND OF THE INVENTION

1. Field of the Invention

The present invention relates to an optical recording medium with which recording/reproducing or reproducing is performed by irradiating a light thereto by means of at least an objective lens having a numerical aperture equal to or more than 1 and relates to its optical recording/reproducing method.

2. Description of the Related Art

The optical recording medium (or a magneto-optical recording medium) represented by a CD (Compact Disc), an MD (Mini Disc) and a DVD (Digital Versatile Disc) is widely utilized as a storage medium of music information, video information, data, programs and so on.

However, based on the demands for a higher sound quality, a higher picture quality and a longer operable time in connection with music information, video information, data, programs and the like, an optical recording medium having a still larger capacity as well as an optical recording/reproducing method and apparatus for recording on and reproducing from such an optical recording medium have been desired.

Thus, to cope with the above-described demands, in the various optical recording/reproducing apparatus, it has been attempted to reduce wavelengths of a light source, for example, a semiconductor laser or to increase a numerical aperture of an objective lens for reducing a diameter of a light spot converged through the objective lens.

For example, as to the semiconductor laser, a GaN semiconductor laser having oscillation wavelengths reduced from 635 nm of the conventional red color laser to 400 nm region has been put into practice, whereby the diameter of the light spot has been reduced.

Further, a so-called near-field optical recording/reproducing system has been examined, in which an objective lens having a numerical aperture of, for example, 1 or more is constituted by using, for example, an optical lens represented by an SIL (Solid Immersion Lens) which has a large numerical aperture and at the same time an objective surface of the objective lens is made to approach to the optical recording medium such that a distance between them may be about a wavelength of the light from a light source or about 1/10 thereof, for recording and reproduction.

As shown in FIG. 21, for example, this near-field optical recording/reproducing system is realized by means of a lens structure of SIL and the like, that is, an objective lens system composed of a first optical lens 21 formed by a high refractive index material and worked, for example, as super-hemispherical shaped and a second optical lens formed by such as a convex lens each positioned in this order from an optical recoding medium 10 side. Various optical recording media and optical recording/reproducing apparatuses which enable the near-field reproduction by using a lens system whose numerical aperture is equal to or more than 1 such as SIL have been proposed in the prior art. (see patent references, for example, 1 and 2 below)

Here, to realize a high-density recording in the near-field optical recording/reproducing system, the same approach is necessary as that of the conventional optical recording/reproducing system and it is necessary to reduce a size of a condensed light spot by shortening the wavelength of a light emitted from a light source and by increasing a numerical aperture of an objective lens.

In this connection, since the area of the condensed light spot is inversely proportional to the square of the numerical aperture of the objective lens, it is effective to increase the numerical aperture of the objective lens in order to realize a high-density recording in the near-field optical recording/reproducing system.

When the optical lens 21 is a super-hemispherical shaped optical lens as, for example, explained in connection with FIG. 21, the numerical aperture NA of the near-field objective lens is expressed as $NA = n_{L1} \times n_{L1} \times \sin\theta_{AIR}$ supposing that the refractive index of the first optical lens is $n_{L1}$ and the angle of the incident light relative to the first optical lens through the air is $\theta_{AIR}$. (see the Published Document 1 other than Patents below)

Consequently, it becomes necessary to increase the refractive index of the first optical lens in order to increase the numerical aperture of the objective lens.

However, a good reproducing characteristic cannot be obtained even if the refractive index of the first optical lens is increased and the numerical aperture NA of the objective lens is increased, and as a result it becomes difficult to realize a high-density and a large-capacity recording/reproducing.

The followings are related published documents:

[Patent Reference 1]
JP Laid-open Patent Publication No. 2001-522117 (WO9923646)

[Patent Reference 2]
JP Laid-open Patent Publication No. 2001-524246 (WO9849675)

[Published Document 1 other than Patents]
T. D. Milster, "Chromatic Correction of High-Performance Solid Immersion Lens Systems", Jpn. J. Appl. Phys., March 1999, Vol. 38, Part 1, No. 3B, pp. 1777-1779

SUMMARY OF THE INVENTION

Accordingly, the purpose of the present invention is to propose an optical recording medium favorably applicable to a near-field optical recording/reproducing system by utilizing an objective lens having a numerical aperture NA which fully performs its characteristic and further to propose an optical recording/reproducing method which can deal with an optical recording medium of a high density and a large capacity.

In order to solve the aforementioned problems, the present invention is directed to an optical recording medium with which recording/reproducing or reproducing is performed by irradiating a light by means of an objective lens having a numerical aperture equal to or more than 1 wherein a recording portion is provided at least at the outer most surface at the irradiation side of the optical recording medium and a relation $n \geq NA$ is selected when the refractive index of the recording portion is n and the numerical aperture of the objective lens is NA.

Additionally, the present invention is directed to the aforementioned optical recording medium, wherein convexes and concaves corresponding to recording information are provided at least on a recording portion in advance such that said convexes and concaves form recording pits.

Further, the present invention is directed to the aforementioned optical recording medium, wherein the optical recording medium is constituted by the same material including the recording portion.

Further, the present invention is directed to the aforementioned optical recording medium, wherein at least the recording portion is made by Si or a high refractive index glass.

Further additionally, the present invention is directed to the aforementioned optical recording medium having convexes and concaves as recording pits, wherein at least the recording portion is made by Si, SiC or a high refractive index glass.

Furthermore, the present invention is directed to an optical recording/reproducing method using the optical recording medium constituted according to each constitution of the aforementioned present invention.

Further, recording/reproducing is performed according to the invention under a condition that the thickness of an air layer between the surface of the recording portion of each of the aforementioned various constitutions and said objective lens is selected equal to or less than 50 nm.

As mentioned above, in the present invention directed to an optical recording medium or its optical recording/reproducing method, a recording portion is provided at least at the outer most surface at the irradiation side of the optical recording medium and the refractive index n of the recording portion is selected to satisfy a relation n≧NA relative to the numerical aperture NA of the objective lens while the inventors of the present invention discovered that especially the value of the refractive index at the outer most surface of the optical recording medium is important in order to realize a high-density recording with a good quality when an optical recording/reproduction is performed by a so-called near-field system using an objective lens having a numerical aperture equal to or more than 1.

Namely, by adapting the aforementioned constitution according to the present invention it became clear that a recording/reproducing of a larger effective numerical aperture can be realized, which could not be attained by using a conventional optical recording medium, that is, a conventional optical recording medium in which the refractive index of the recording portion or the outer most surface portion is selected smaller than the numerical aperture NA of the objective lens.

To explain this subject, FIGS. 3A and 3B respectively show a case of a conventional constitution of an optical recording medium and a case of an optical recording medium according to a constitution of the present invention in simple comparative models where it can be seen that in case of the conventional constitution of the optical recording medium, the relation between the refractive index n of the recording portion or the outer most surface portion and the numerical aperture NA of the objective lens is selected as n<NA and an observed area 31 of a reflected light becomes smaller than an irradiation area 30 of the incident light therein, so that the area is restricted, in short, according to the value of the refractive index n.

However, as shown in FIG. 3B, in case of the optical recording medium according to a constitution of the present invention, it became clear that the irradiation area 30 of the incident light and the observed area 31 of the reflected light become approximately equal to each other by selecting the refractive index n of the recording portion of the outer most surface—especially as n≧NA. Consequently, it can be understood that according to the present invention a larger effective numerical aperture can be attained as compared with that for a conventional optical recording medium.

As a result, by irradiating a recording light which has an appropriate wavelength and power to the target of an optical recording medium by means of an objective lens having a numerical aperture of 1 or more, recording pits are formed in response to the quality change, deformation, oxidation, reduction and the like of the recording portion such that a recording/reproducing of good quality can be realized by reproducing the recording pits, so that it becomes possible to propose a high density optical recording medium with a good characteristic.

Additionally, an optical recording medium for reproduction-only can be proposed in a case when recording pits are formed by concaves and convexes made in advance in response to the recording information.

Further, an optical recording medium of a lower cost can be proposed according to the present invention by making its manufacturing process simpler in a case when an optical recording medium is constituted with the same material including the recording portion, in short, as a one-body constitution.

Further, it became possible to make a near-field reproduction with a good reproducing characteristic as explained in detail relating to embodiments mentioned hereinafter by constituting at least the recording portion of the optical recording medium with, for example, Si or a high refractive index glass. In this case it can propose an optical recording medium which does not include injurious metals and has little environment harmfulness. Especially, if Si is used, recycle can be attained after melting it.

Furthermore, according to an optical recording medium on which recoding pits are formed by providing aforementioned concaves and convexes, it became possible to obtain a good reproducing characteristic as explained in detail relating to the embodiment mentioned hereinafter by constituting at least the recording portion of the optical recording medium with Si, Sic or a high refractive index glass, and in this case it can realize to obtain an optical recording medium for reproduction-only whose cost is a low and which has little environment harmfulness.

Further, the diameter of the light beam realized by the objective lens can be smaller by using an optical recording medium according to the invention and by selecting the thickness of an air layer between the objective lens and the optical recording medium equal to or less than 50 nm, so that it became possible to realize a near-field optical recording/reproducing with a certainly good recording/reproducing characteristic in an optical pickup apparatus and an optical recording/reproducing apparatus which can deal with an optical source having a wavelength from 200 nm to 500 nm and which is expected to be developed in response to a tendency of an optical recording medium of a higher density and a larger capacity.

BRIEF DESCRIPTION OF THE DRAWINGS

FIG. 3A shows a case for a conventional optical recording medium and FIG. 3B shows a case for an optical recording medium according to the present invention;

FIGS. 17A and 17B are diagrams respectively and comparatively showing signal waveforms in connection with one practical example of an optical recording medium and a comparison example;

DESCRIPTION OF THE PREFERRED EMBODIMENTS

Various exemplified embodiments according to the optical recording medium and the optical recording/reproducing method of the present invention will be explained in detail hereinafter.

Figure 1:
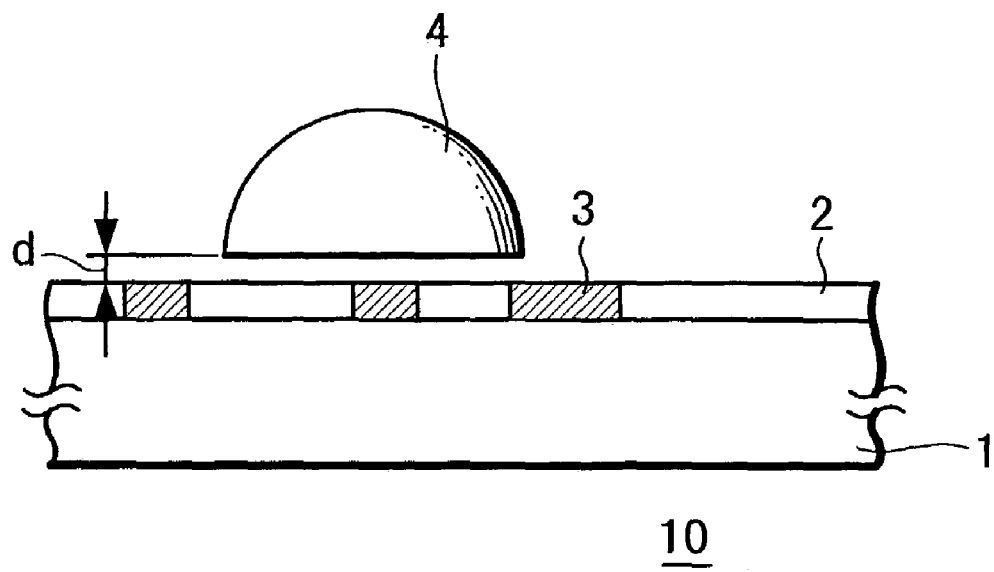
FIG. 1 is a simplified schematic cross-sectional view according to the present invention showing a main part of one example of an optical recording medium in an enlarged form.

As a simplified schematic cross-sectional view is shown as an example in FIG. 1, the optical recording medium according to the present invention is an optical recording medium 10 for which a recording/reproducing or reproducing is performed by a light irradiation using an objective lens 4 having a numerical aperture equal to or more than 1 where a recoding portion 2 is provided at least at the outer most surface at the irradiation side of the optical recording medium 10 and a relation n≧NA is selected when the refractive index of the recording portion 2 is n and the numerical aperture of the objective lens 4 is NA.

In this constitution, by irradiating a recording light which has an appropriate wavelength and power by means of an objective lens 4 having a numerical aperture of 1 or more, recording pits 3 are formed in response to the quality change, deformation, oxidation, reduction and the like of the recording portion 2.

As especially explained in detail for the example hereinafter, a good quality recording/reproducing can be realized when Si or a high refractive index glass is used as a material constituting at least the recording portion 2.

Figure 2:
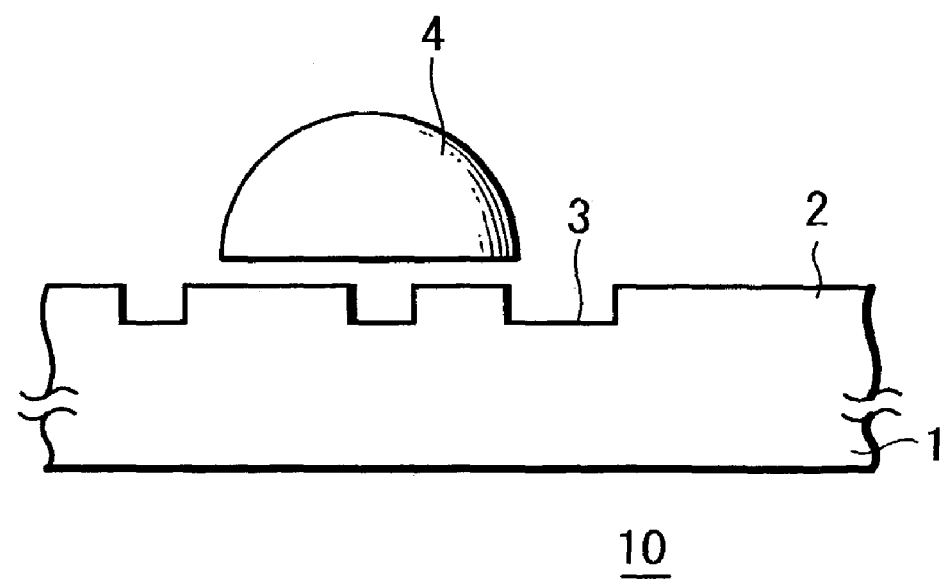
FIG. 2 is a simplified schematic cross-sectional view according to the present invention showing a main part of another example of an optical recording medium in an enlarged form.

Additionally, as a simplified schematic cross-sectional view is shown in FIG. 2, another optical recording medium according to the present invention is provided with concaves and convexes corresponding to recording information at least on the recording portion 2 in advance such that the convexes and concaves form recording pits 3.

In case that such convexes and concaves are provided on an optical recording medium for a constitution of reproduction-only, a certainly good quality recording/reproducing can be realized when at least the recording portion 2 is constituted by Si or a high refractive index glass.

It should be noted that according to both examples shown in FIG. 1 and FIG. 2, the recoding portion 2 can be constituted by the same material as the substrate 1, in short, as a one-body constitution, so that it becomes possible to propose the optical recording medium with a large capacity and a low cost by making the manufacturing process simpler and by making the cost thereof lower. It is needless to say that it is possible to constitute the substrate portion by a material having a lower refractive index.

As mentioned above, by making the material of the recoding portion 2 at the outer most surface of the optical recording medium 10 with a material having a refractive index equal to or more than the numerical aperture of the objective lens 4, the reflected light can be obtained from the area 31 approximately equal to the numerical aperture NA of the objective lens 4 as explained in connection with the above mentioned FIG. 3B, so that the effective numerical aperture can be increased as compared with that of the prior art.

Further in FIG. 1, by selecting the thickness d of the air layer between the objective lens 4 and the optical recording medium 10 equal to or less than 50 nm, it becomes possible to realize a near-field optical reproducing using an optical source having a wavelength from 200 nm to 500 nm, so that a higher density and a larger capacity of recording can be certainly attained.

Figure 21:
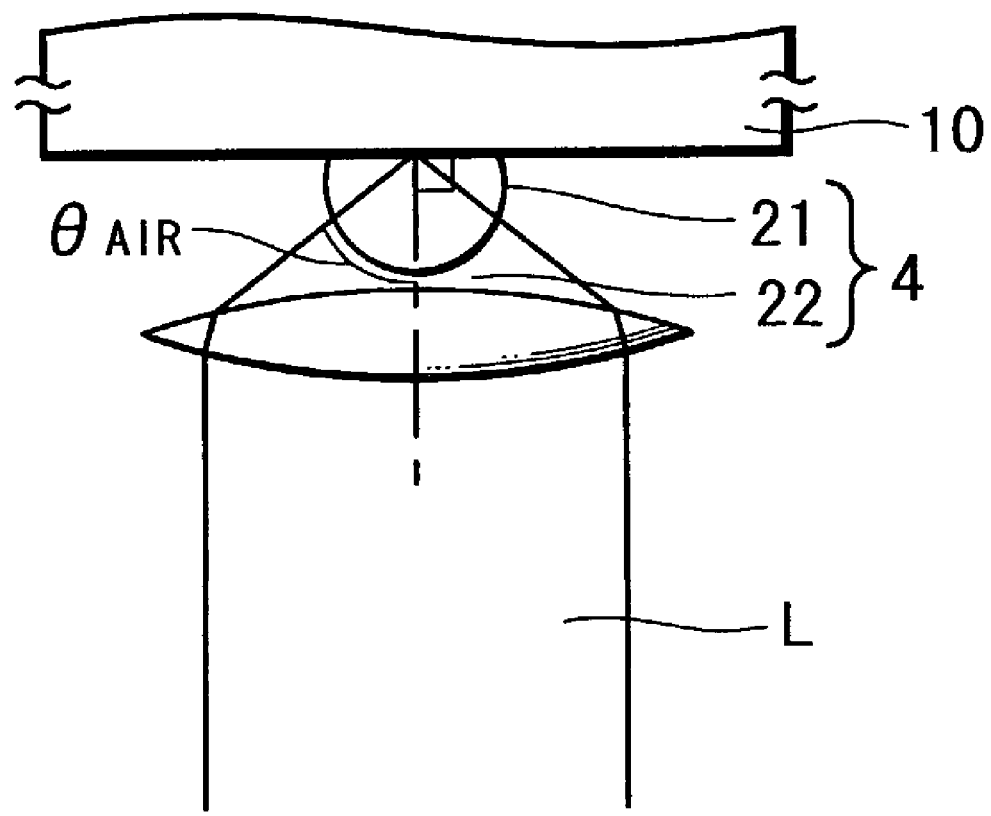
FIG. 21 is a schematic constitutional diagram showing one example of an optical system of a near-field optical reproducing system.

Here, any objective lens 4 can be used if the numerical aperture NA thereof is equal to or more than 1, but it should be noted that an objective lens system of the SIL type constitution similar to the example of FIG. 21 as explained above, for example, can be used instead.

When an objective lens system of the SIL type is used, various forms can be applied to the optical lens 21 as explained hereinafter.

Figure 4:
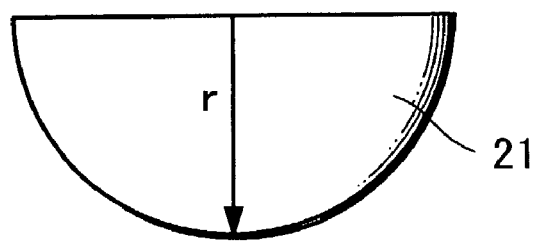
FIG. 4 is a schematic cross-sectional view showing one example of an objective lens.

FIG. 4 is a schematic cross-sectional view of the first optical lens 21. As shown in the drawing, the first optical lens 21 is hemispherical-shaped and has a flat surface of an objective surface which is an opposing surface which opposes to the optical recording medium 10 while the opposite surface of this objective surface is a convex and spherical-shaped. Additionally the peripheral side surface thereof is a fixed surface to be fixed to a holding body of a two-axis actuator, a slider or the like.

Figure 5:
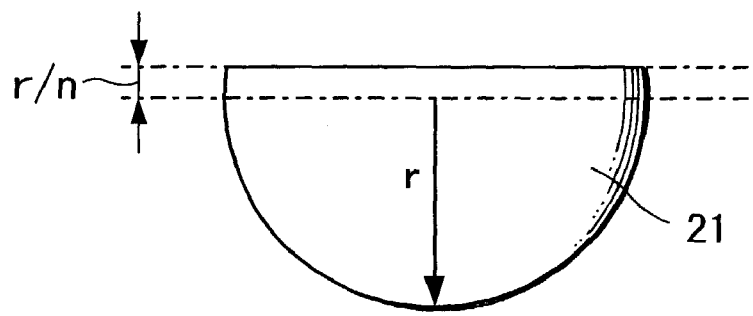
FIG. 5 is a schematic cross-sectional view showing another example of an objective lens.

It should be noted that the first optical lens 21 can be a hemispherical optical lens as shown in FIG. 4 and also can be a super-hemispherical optical lens as shown in FIG. 5.

Figure 6:
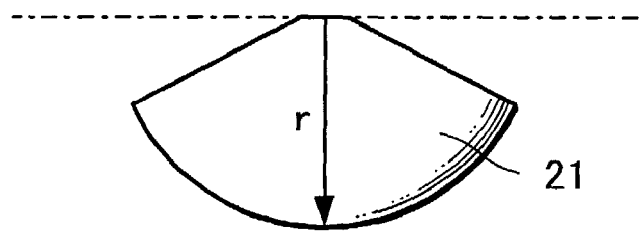
FIG. 6 is a schematic cross-sectional view showing a further example of an objective lens.
Figure 7:
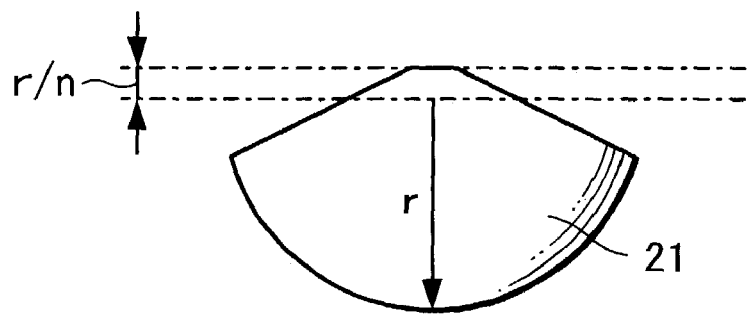
FIG. 7 is a schematic cross-sectional view showing a still further example of an objective lens.

Further, in the near-field optical recording/reproducing system, the optical recording medium 10 and the first optical lens 21 are very close to each other and a distance between them is as small as several tens nm or so, so that the objective surface of the first optical lens 21 can be worked into a conical-shaped one as shown in FIG. 6 or FIG. 7 in order to increase a tolerance with respect to an inclination of the optical recording medium 10 or the first optical lens 21.

Now, if the refractive index of the first optical lens 21 is as large as possible, it becomes possible to increase the numerical aperture of that optical lens as much. Therefore, it is desirable to use a high refractive index glass, a material including a high refractive index glass as a main component, $ZrO_2$, a material including $ZrO_2$ as a main component, $SrTiO_3$, a material including $SrTiO_3$ as a main component, $Bi_4Ge_3O_{12}$, a material including $Bi_4Ge_3O_{12}$ as a main component and the like.

The material such as a high refractive index glass, $ZrO_2$, $SrTiO_3$, $Bi_4Ge_3O_{12}$ and materials including those as main components has a refractive index which is high in the wavelength range from 300 nm to 800 nm and, for example, has a refractive index of 2.0 or more for the wavelength from 390 nm to 420 nm which is an oscillated wavelength of a GaN semiconductor laser.

Consequently, when a GaN semiconductor laser is used as a light source, an optical lens formed by a high refractive index glass, $ZrO_2$, $SrTiO_3$ or $Bi_4Ge_3O_{12}$ as its material becomes an effective means for making the waveform of a light source shorter and for making a numerical aperture of the objective lens higher in an optical reproducing system, so that it can devote to a higher density and a larger capacity version of an optical recording medium.

In the present invention mentioned above, the refractive index n is selected relative to the numerical aperture NA to satisfy n≧NA, but it should be noted that a practical material having a refractive index n>6 has not been developed yet. Therefore, in the present time the refractive index of the recording portion is practically selected in a range of NA≦n≦6.

Next, various examples relating to the optical pickup apparatus or the optical recording/reproducing apparatus where optical recording media according to the constitution of the present invention will be explained.

As shown in the aforementioned FIG. 21, each of the examples is shown as employing an SIL type and a so-called near-field optical reproducing system where an objective lens composed of a first optical lens and a second optical lens each positioned in this order from an object side is provided.

Exemplified embodiments according to the present invention will be explained hereinafter in connection with FIG. 8 to FIG. 11.

Figure 8:
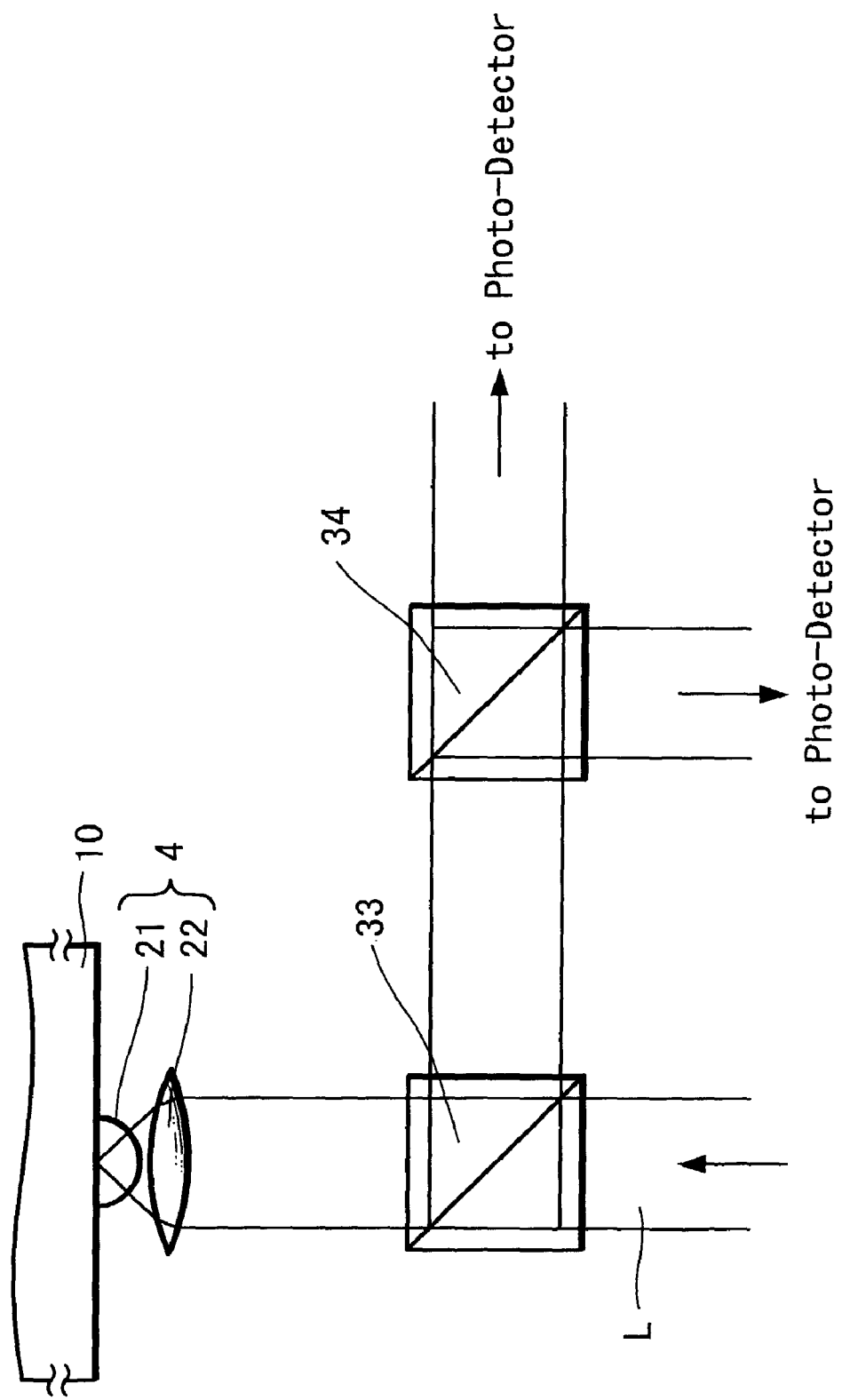
FIG. 8 is a schematic constitutional diagram according to the present invention showing a main part of one example of an optical recording/reproducing apparatus.

FIG. 8 is a block diagram showing an exemplified embodiment of an optical recording/reproducing apparatus according to the present invention.

Supposing the optical recording medium is, for example, a disc-shaped one, it is supported by a spindle motor not shown and rotated with a predetermined rotation number.

A going light L emitted from a light source, for example, a semiconductor laser is converted into a parallel light by a collimator lens (not shown), penetrates a first beam splitter 33 and is condensed on a recording portion at the outer most surface of the optical recording medium 10 through the objective lens 4.

In case of an SIL type constitution, an objective lens is composed of a first optical lens 21 and a second optical lens 22 each positioned in this order from the optical recording medium side.

A returning light reflected by an information reproducing surface passes through the objective lens 4, reflected by the first beam splitter 33 and enters a second beam splitter 34. The returning light passing through the second beam splitter 34 is condensed to a photo detector for focusing (not shown) where a focusing error signal and a reproduced bit signal are detected.

Further, the returning light reflected by the second beam splitter 34 is condensed on a light detector for tracking (not-shown) where a tracking error signal is detected.

Figure 9:
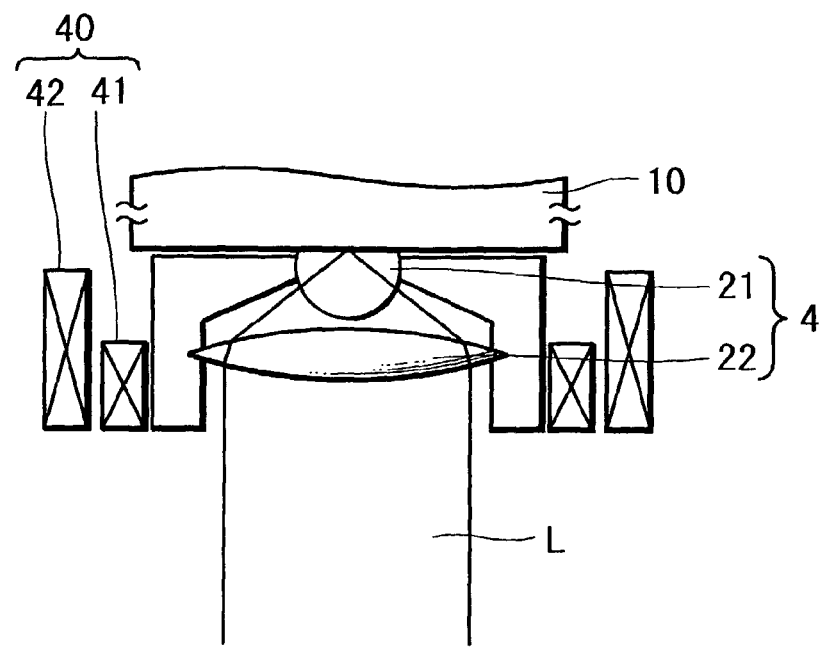
FIG. 9 is a schematic constitutional diagram according to the present invention showing a main part of another example of an optical recording/reproducing apparatus.

Moreover, the objective lens 4 is supported by a two-axis actuator 40 as one constitutional example is shown as an example in FIG. 9. The two-axis actuator 40 includes, for example, a focusing coil 41 and a tracking coil 42 where the objective lens 4 is controlled to be driven in a focusing direction and in a tracking direction.

The two-axis actuator 40 is provided for making it possible to control a distance between the optical recording medium 10 and the first optical lens 21, for example, by monitoring an amount of the returning light and by feeding back its distance information such that the distance between the optical recording medium 10 and the first lens 21 can be kept constant and at the same time a collision between the first lens 21 and the optical recording medium 10 can be avoided.

Additionally, the two-axis actuator 40 monitors an amount of the returning light in a tracking direction and feedbacks a position information such that it becomes possible to move the condensed spot onto a desired reproducing track.

Figure 10:
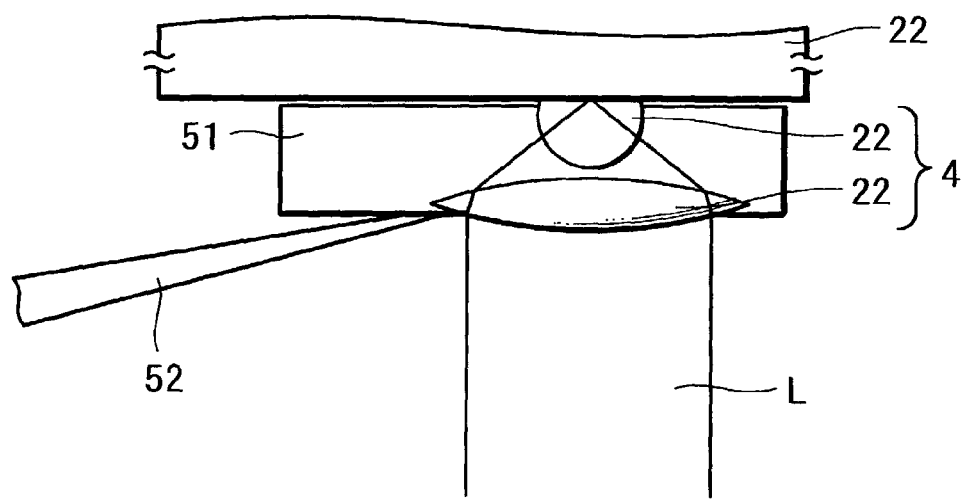
FIG. 10 is a schematic constitutional diagram according to the present invention showing a main part of a further example of an optical recording/reproducing apparatus.

As another constitutional-example as shown in FIG. 10 as an example, the objective lens 4 can be held to, for example, a slider 51 which is controlled to be driven in a tracking direction. The slider 51 is supported by an optical moving part forming, for example, an optical pickup and movable in a tracking direction through an elastic member such as gimbals 52 which has elasticity only in a plane-shake direction of the optical recording medium 10.

The optical moving part is controlled to be driven in the tracking direction by a control/drive means composed of a linear motor or the like. Then, a gas stream generated in accordance with the rotation of the optical recording medium 10 flows into a gap between the optical recording medium 10 and the slider 51 to form a gas thin-film which balances with a pressure of the elastic member onto the optical recording medium 10, so that the slider 51 floats by keeping a constant distance of, for example, 50 nm relative to the optical recording medium 10.

In other words, when information is reproduced from the optical recording medium 10 when the optical recording medium 10 is rotated at a predetermined speed, the distance between the first optical lens 21 forming the objective lens 4 and the optical recording medium 10 is kept approximately constant by means of the slider 51.

In addition, in order to correct a remaining focus error component after the two-axis actuator 40 controlling the objective lens 4 or the slider 51 follows a plane-shake and in order to correct an error component occurred in a process for assembling the aforementioned objective lens 4, a relay lens which can make a correction by changing an interval between two optical lenses can be interposed between the first beam splitter 32 and the second optical lens 22 if it is necessary.

Further, in case that the first optical lens 21 and the second optical lens 22 are held by the slider 51, it is possible to adopt such a constitution in order to correct a remaining focus error component after the slider 51 follows for the correction and in order to correct an error component occurred in a process for assembling the aforementioned objective lens as a constitution where the first optical lens 21 forming the objective lens 4 is fixed to the slider 51 and the second optical lens 22 will be moved in an optical-axis direction by means of, for example, a piezoelectric element and the like.

Figure 11:
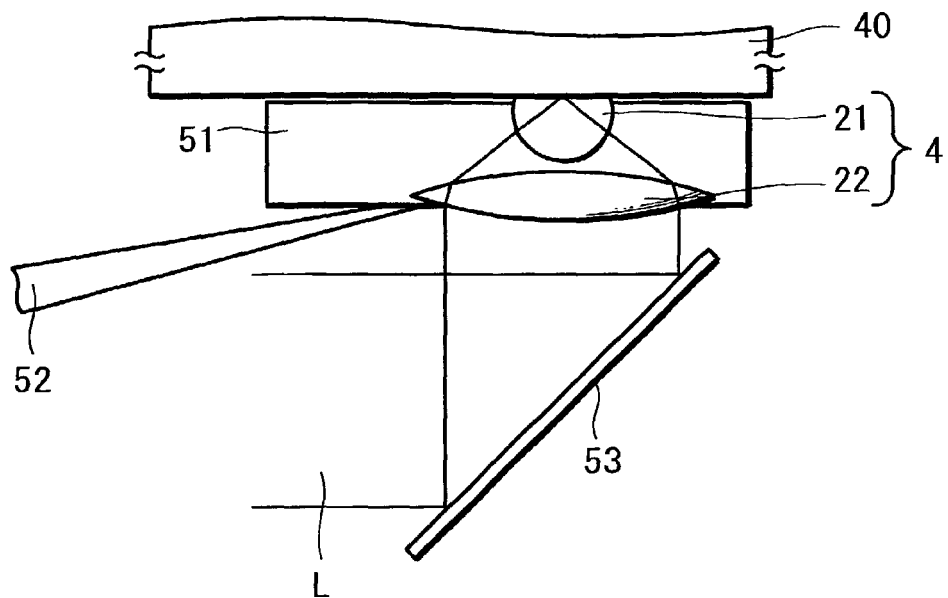
FIG. 11 is a schematic constitutional diagram according to the present invention showing a main part of a still further example of an optical recording/reproducing apparatus.

Moreover, in case of an optical reproducing apparatus where the spindle motor has a means for mounting a plurality of optical recording media, it is effective for the slider 51 to be further provided with a mirror 53 which bends the optical axis by an amount of approximately 90 degrees as shown in the schematic constitution of FIG. 11.

According to an optical recording/reproducing apparatus of such a constitution, it becomes possible to reduce an interval between the optical recording media, so that the apparatus having a structure to which a plurality of optical recording media will be loaded can be made smaller in size and thinner in thickness.

Next, an exemplified embodiment using an embodied material will be explained.

PRACTICAL EXAMPLE 1

This practical example shows a case where a lens constituted as an SIL type constitution is used for an objective lens as explained in the aforementioned FIG. 8.

As an objective lens an optical lens which is made by a high refractive index glass S-LAH79 material manufactured by OHARA INC. and was formed by cutting or working into 10 mm×10 mm in size and 2 mm in thickness and then optically grinded at both sides of the surfaces is used as the first optical lens.

The refractive index of this lens material was measured for the wavelengths from 380 nm to 800 nm using a spectroscopic ellipsometer VASE made by J.A. Woollam Japan Co., Inc. This result is shown in FIG. 12.

Figure 12:
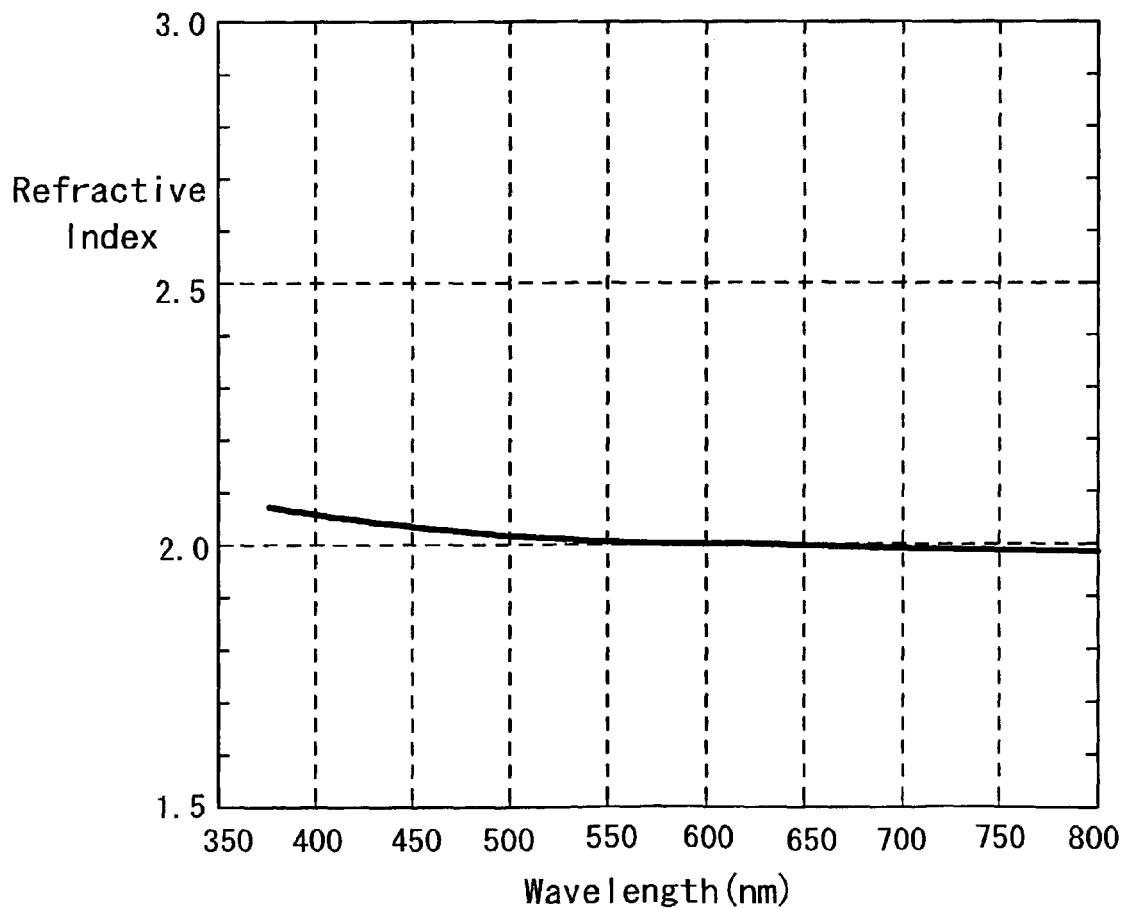
FIG. 12 is a diagram showing the dependence of a refractive index on a wavelength in one example of an objective lens material.

It can be seen from FIG. 12 that the high refractive index glass S-LAH79 has a relatively high refractive index as compared with other glass materials in the range of all wavelengths from 380 to 800 nm and the value thereof reaches 2.0 or more in the vicinity of a wavelength of 400 nm.

Further in the following table 1, a refractive index of the sample mentioned above and a numerical aperture of the objective lens are shown when the numerical aperture of the second lens 22 is 0.42 and the first optical lens 21 is made by the aforementioned material so as to assemble an objective lens in the form as explained in FIG. 8.

TABLE 1

| Name of Material | Refractive index at Wavelength of 405 nm | Numerical Aperture of Objective lens |
|---|---|---|
| S-LAH79 | 2.075 | 1.81 |

It is clear from this table 1 that the numerical aperture of an objective lens made by S-LAH79 which has a high refractive index as a glass material becomes clearly larger than the numerical aperture of an objective lens used for a conventional MD, CD, DVD and the like and additionally the value thereof becomes equal to or more than 1.

Accordingly, the area of the condensed light spot condensed by the objective lens made by this material can be reduced inversely proportional to the square of the numerical aperture thereof, so that it becomes possible to realize an optical pickup apparatus for recording/reproducing to and from the optical recording medium with a high density which is approximately ten times higher compared, for example, with a DVD objective lens which has a numerical aperture of 0.6.

Next, the reproduced signal was evaluated relative to the refractive index of an optical recording medium when an optical pickup apparatus based on the objective lens made as mentioned above and having a numerical aperture of 1.81 and an optical recording/reproducing apparatus are used.

In this practical example 1, the optical recording medium 10 is formed as a one-body constitution including the substrate 1 and the recoding portion 2 by using single crystal Si.

Figure 13:
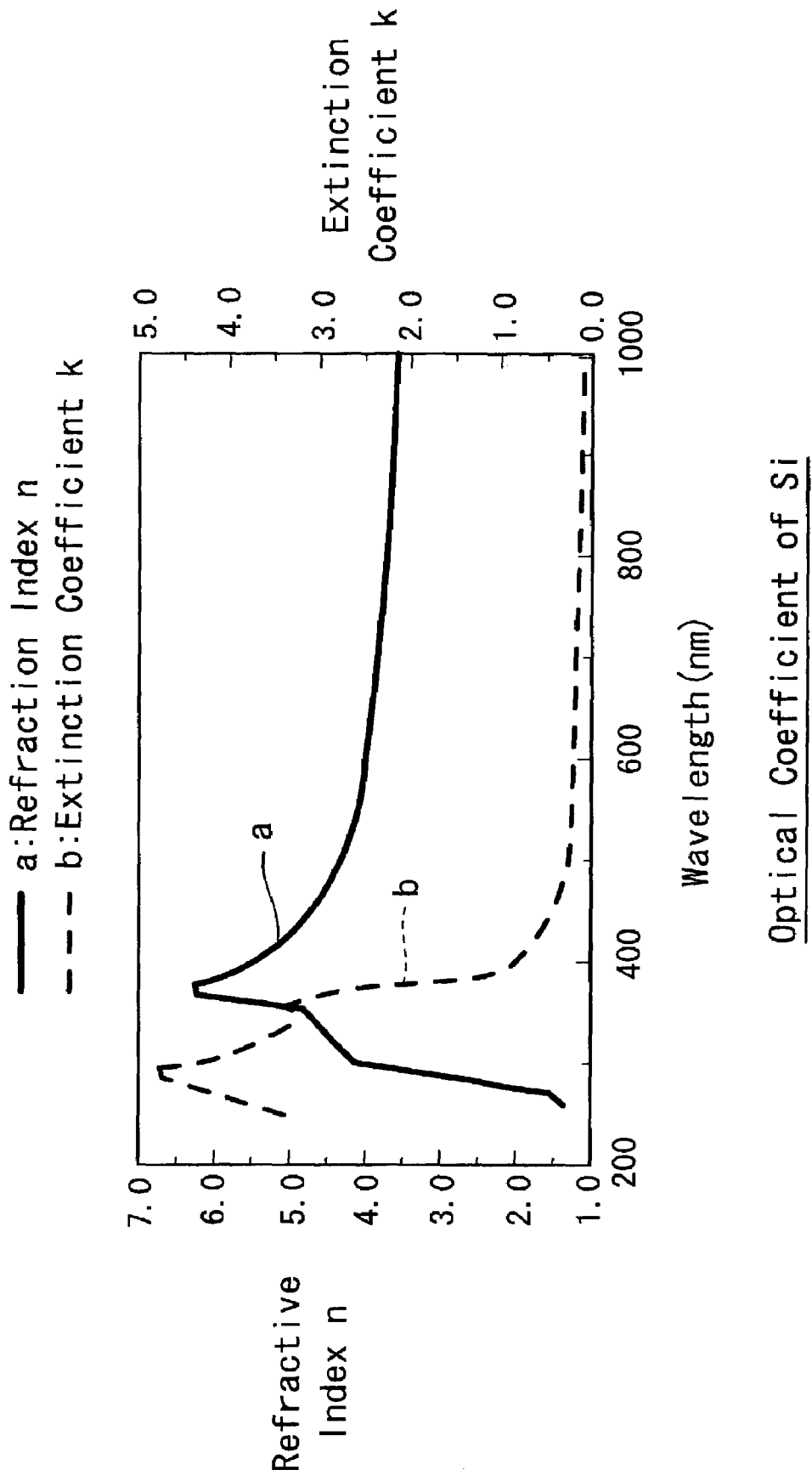
FIG. 13 is a diagram showing the dependence of a refractive index on a wavelength in connection with silicon.

FIG. 13 shows the dependence of the optical coefficient on the wavelength. In FIG. 13 the actual line a shows the refractive index and the broken line b shows the extinction coefficient k. It can be seen that the refractive index n shows a high value of 5.32 in the vicinity of the wave length of 405 nm.

A (1, 7)RLL modulated random signal having a bit length of 100 nm was recorded with respect to the optical recording medium using an optical system which has a light source of wavelength 405 nm and the above mentioned objective lens of a numerical aperture 1.81.

Thereafter, the recording pit signal of the optical recording medium 10 was reproduced by the optical recoding/reproducing apparatus which has the optical system mentioned above. In this case the signal waveform became as shown in FIG. 14.

Figure 14:
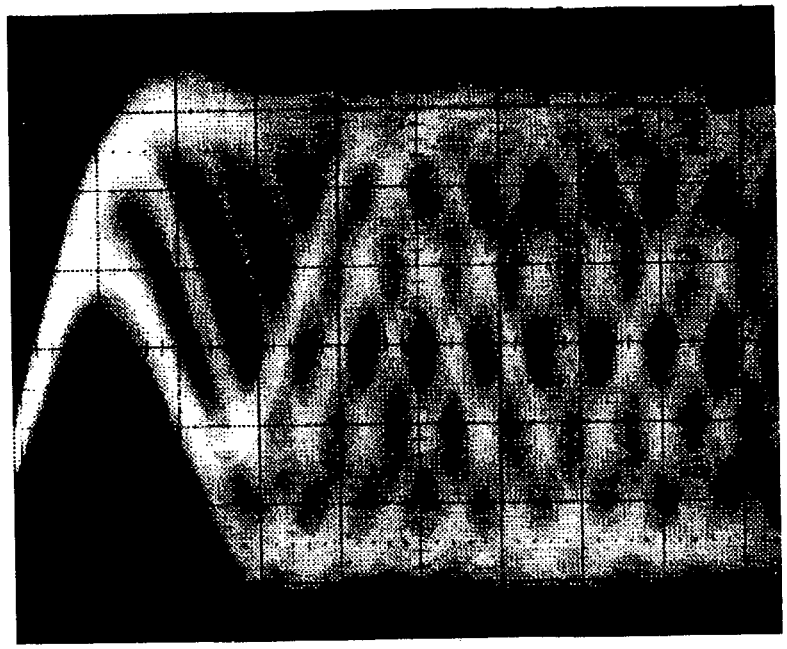
FIG. 14 is a diagram showing a signal waveform according to one example of an optical recording medium of the present invention.

It can be understood that a clear signal pattern was reproduced by seeing the signal waveform shown in FIG. 14.

COMPARISON EXAMPLE 1

For the comparison example 1, the optical recording medium 10 is formed as a one-body constitution including the substrate 1 and the recoding portion 2 by using a quartz glass having a refraction index of 1.50. The measured result for this case will be described.

Figure 15:
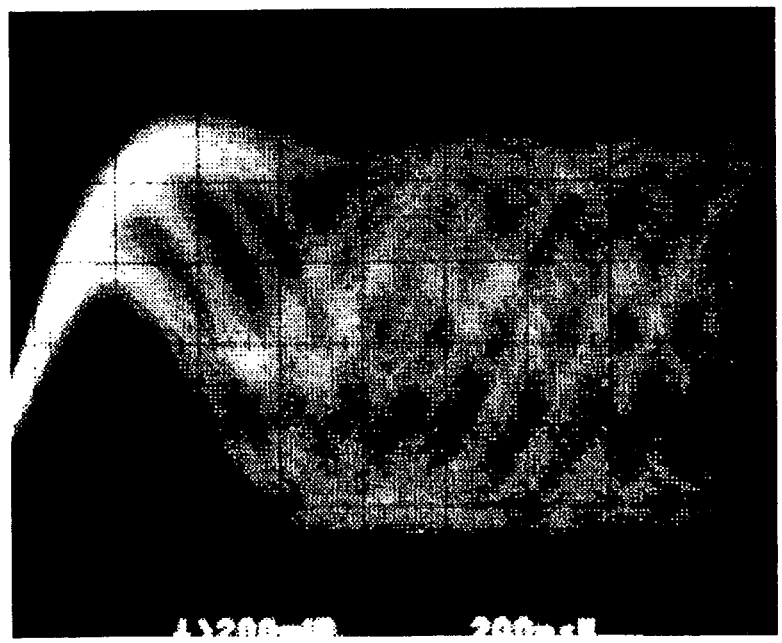
FIG. 15 is a diagram showing a signal waveform according to a comparison example of an optical recording medium.

In this comparison example 1, too, a (1, 7)RLL modulated random signal having a bit length of 100 nm is recorded and thereafter the recording pit signal is reproduced just like the above mentioned practical example 1 by using an optical pickup whose objective lens has a numerical aperture of 1.81 and an optical recording/reproducing apparatus which has a laser light source of wavelength of 405 nm to obtain a reproduced signal as shown in FIG. 15.

As shown in FIG. 14, a very clear signal pattern is reproduced when the optical recording medium is silicon and the ratio between the shortest mark and the longest mark, that is, the modulation factor became approximately 46%.

On the other hand as shown in FIG. 15, a clear signal pattern could not be reproduced when the recording portion at the outer most surface of the optical recording medium is a quartz glass having a refractive index of 1.50 and the ratio between the shortest mark and the longest mark (modulation factor) became approximately 26%. These results are shown in a table 2 below.

TABLE 2

| | Refractive index at Recording Portion | Modulation Factor |
|---|---|---|
| Practical Example 1 | 5.32 | 46% |
| Comparison Example 1 | 1.50 | 26% |

Consequently, it is to be understood from the result of this table 2 that the reproduced signal is much influenced by the material of the recording portion at the outer most surface of the recording medium even if the optical recording medium has the same density.

In more detail, in the practical embodiment 1 as shown in the table 2, the refractive index of the recoding portion is 5.32 which is larger than the numerical aperture NA of the objective lens which is 1.81, so that a favorable reproduced waveform can be obtained and the modulation factor thereof becomes relatively high. On the other hand, in the comparison example 1, the refractive index of the recoding portion is 1.50 which is smaller than the numerical aperture of the objective lens, so that a favorable reproduced waveform can not be obtained and the modulation factor thereof becomes low. Therefore, it is clear that the quality of the reproduced signal is very much influenced by which is larger or smaller in the value relation between the numerical aperture NA and the refractive index of the recording portion at the outer most surface of the optical recording medium.

This supports the fact that the pattern from the objective lens will be restricted by the refractive index of the recording portion at the outer most surface of the optical recording medium as explained in connection with FIG. 3.

Figure 3A:
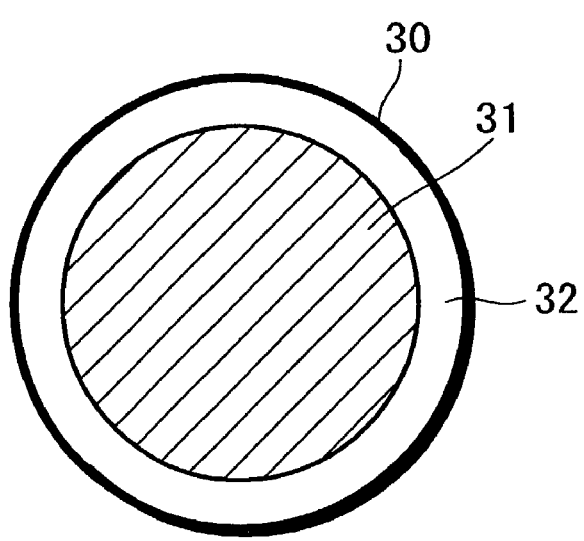
FIGS. 3A and 3B are diagrams for explaining a relation between an irradiated area of an incident light and a returning light, where
Figure 3B:
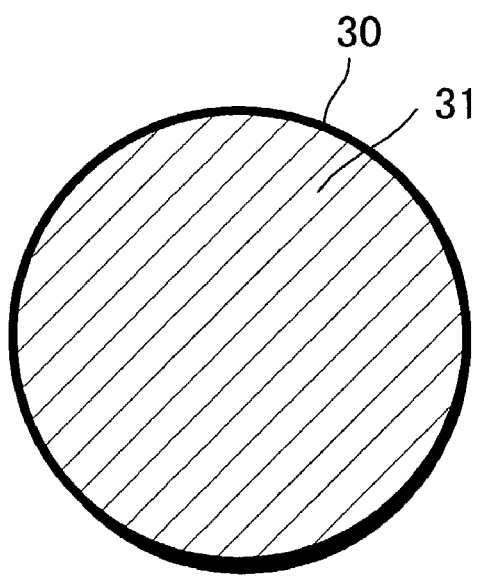

The pattern from the objective lens of the above mentioned practical embodiment 1 is observed as a deep-black pattern same as the area shown by oblique lines in the aforementioned FIG. 3B.

To the contrary, the pattern from the objective lens of the comparison example 1 is observed having a white ring same as the area 32 shown in FIG. 3A.

This white ring is a phenomenon caused by the fact that the numerical aperture NA of the objective lens is larger than the refractive index of the quartz glass, and as a result it shows that the numerical aperture NA of the objective lens is restricted to the refractive index of the quartz glass.

On the other hand, the deep-black pattern is a phenomenon caused by the fact that the numerical aperture NA of the objective lens is smaller than the refractive index of the silicon, and as a result it shows that the numerical aperture NA of the objective lens is not restricted to the refractive index of the silicon.

Based on the results of the above practical embodiment 1 and the comparison example 1, it can be understood that the optical recording medium according to the present invention proposes an optical recording medium where the effective numerical aperture is increased, which could not be realized in the conventional way and where a high density recording is attained with a good reproducing characteristic.

In the above practical embodiment 1 it was explained in case that a single-crystal silicon is used, but it should be noted that the same results could be obtained in case of using, for example, other high refractive index glasses as the recording portion for recording/reproducing.

Figure 16:
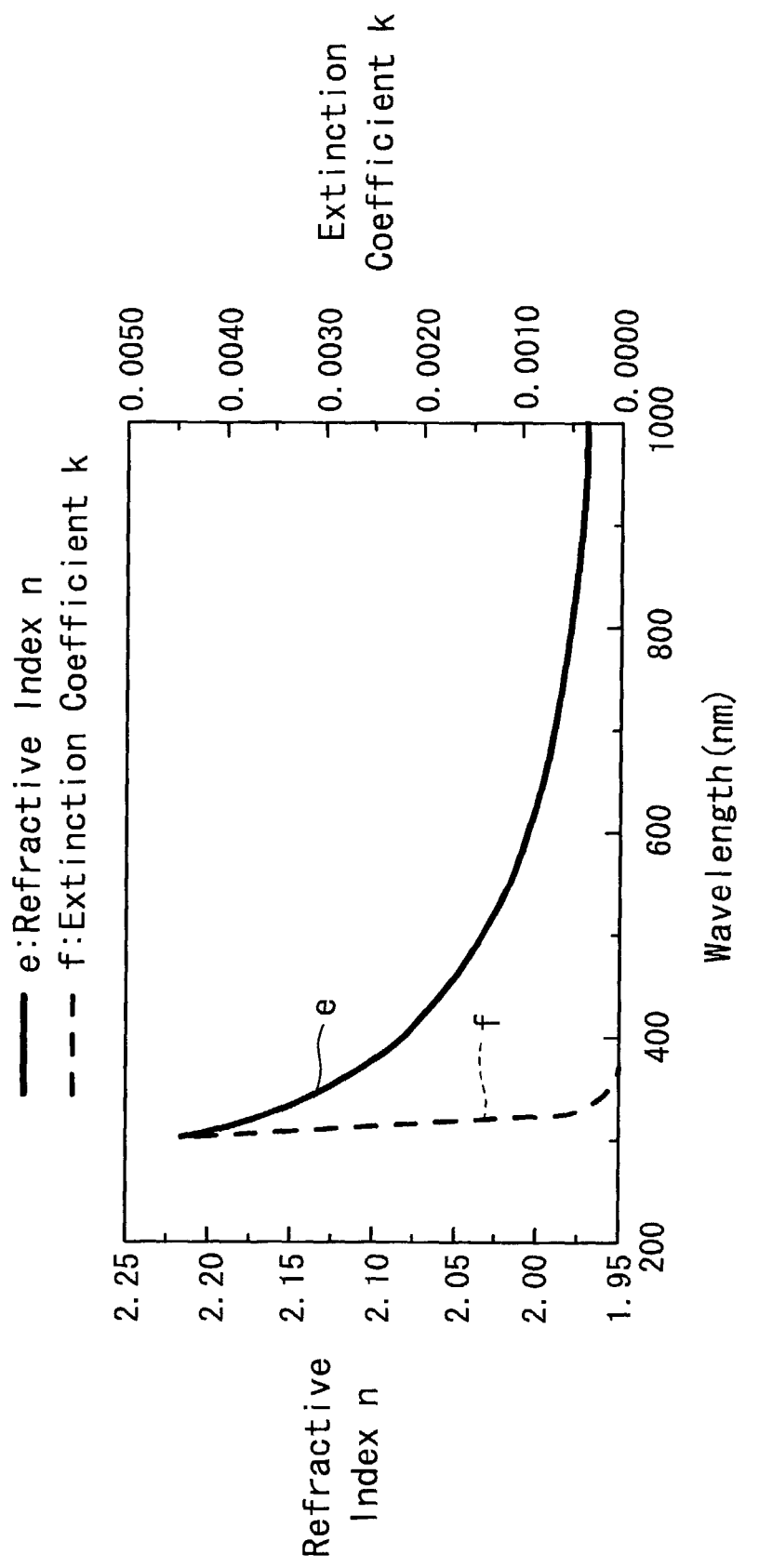
FIG. 16 is a diagram showing a dependency of a refractive index and an extinction coefficient on a wavelength in connection with one example of a high refractive index glass.

In FIG. 16 an optical characteristic of an S-LAH79 glass made by OHARA INC. is shown as an example, and in this case the dependency of a refractive index and an extinction coefficient upon a wavelength is shown. In FIG. 16 a solid line e shows the refractive index and a broken line f shows the extinction coefficient. In this way, as the high refractive glass, a material whose refractive index n is larger than the numerical aperture NA in its practical wavelength band can be used as at least a recoding portion of an optical recording medium.

Additionally, in the abovementioned practical example 1 both the substrate 1 and the recording portion 2 are constituted by the same material, but it can be said that a similar effect can be obtained when the substrate 1 is constituted by another material having a relatively low refractive index.

PRACTICAL EXAMPLE 2

Next, a case where for the optical recording medium according to the present invention, concaves and convexes are provided on the recoding portion 2 corresponding to the recoding information and a so-called reproduction-only type is constituted by using these concaves and convexes as recording pits will be explained.

In this practical example 2, a case where a sample prepared by working a high refractive index glass S-LAH79 material made by OHARA INC. into a piece of 10 mm×10 mm in size and 2 mm in thickness and by optically grinding both the surfaces thereof is used as an optical lens as same as the objective lens used in the practical example 1 will be explained.

Then, a refractive index of the sample at wavelengths from 380 nm to 800 nm was measured by a spectroscopic ellipsometer VASE made by J.A. Woollam Japan Co., Inc. The dependency of a refractive index of this material upon the wavelength is as shown in the aforementioned FIG. 12.

As mentioned above, it can be seen that the material of the high refractive index glass S-LAH79 has a relatively high refractive index as compared with other glass materials in the range of all wavelengths from 380 to 800 nm and the value thereof reaches 2.0 or more at a wavelength in the vicinity of 400 nm.

Further, as shown in the table 1, the refractive index of this material at the wavelength of 405 nm is 2.075 and the numerical aperture NA of the objective lens is 1.81 when the objective lens such as a form explained in the abovementioned FIG. 8 is constituted by selecting the numerical aperture of the second optical lens 22 as 0.42 and by using this material for the first optical lens 21.

In this way the numerical aperture of the objective lens made by using S-LAH79 which has a high refractive index as a glass material becomes equal to or more than 1 as in the case of the practical example 1, and consequently the area of the condensed light spot can be made smaller in inversely proportional to the square of the numerical aperture of the objective lens, so that an optical pickup apparatus for recording/reproducing to and from an optical recording medium with 10 times higher density than that of a DVD objective lens which has a numerical aperture of 0.6 can be realized.

Next, the reproduced signal was evaluated relative to the refractive index of an optical recording medium when an optical pickup apparatus based on the objective lens having a numerical aperture of 1.81 as being made as mentioned above and an optical recording/reproducing apparatus are used.

Here, the results will be described in connection with cases when Si is used as an optical recording medium for an embodied practical example and when a quartz glass is used as an optical recording medium for a comparison example respectively.

First, as a practical example 2, an optical recording medium made by a single-crystal silicon is provided, a photo-resist for an electron beam is plated thereon and thereafter a (1, 7)RLL modulated random signal having a bit length of 78.8 nm was recorded with track pitches of 226 nm by means of electron beam exposure, and thereafter reproducing pit signals are recorded directly on the silicon substrate by means of a development process and an etching process.

COMPARISON EXAMPLE 2

Similarly, as a comparison example 2, an optical recording medium made by a quartz glass is provided, a photo-resist for an electron beam is plated thereon and thereafter a (1, 7)RLL modulated random signal having a bit length of 78.8 nm was recorded with track pitches of 226 nm by means of electron beam exposure, and thereafter reproducing pit signals are recorded directly on the quartz glass substrate by means of a development process and an etching process.

In connection with the optical recording media of these practical example 2 and comparison example 2, the signal waveforms reproduced by using an optical pickup apparatus whose objective lens has a numerical aperture 1.81 and an optical reproducing apparatus which has a laser light source of a wavelength 405 nm are shown in FIGS. 17A and 17B respectively where FIG. 17A shows the signal waveform of the comparison example 2 and FIG. 17B shows the signal waveform of the practical example 2.

As shown in FIG. 17B, a very clear signal pattern is reproduced when the optical recording medium is silicon and the ratio between the shortest mark and the longest mark was approximately 40%.

On the other hand as shown in FIG. 17A, a clear signal pattern could not be reproduced when the optical recording medium is a quartz glass and the ratio between the shortest mark and the longest mark was approximately 25%.

Consequently, it is clear also for the reproduction-only type optical recording medium that the reproduced signal is much influenced by the material even if the optical recording medium has the same density.

Namely, it can be understood also for the reproduction-only type that the reproducing characteristics are very much influenced by the refractive index at the wavelength 405 nm of the laser light source of the optical reproducing apparatus.

In a table 3 below it is shown the respective refractive indexes and modulation factors at the wavelength 405 nm of the laser light of the optical reproducing apparatuses which are used in the above mentioned practical example 2 and comparison example 2.

It should be noted that the refractive indexes of these samples were measured using a spectroscopic ellipsometer VASE made by J.A. Woollam Japan Co., Inc.

TABLE 3

|  | Refractive index at Recording Portion | Modulation Factor |
|---|---|---|
| Practical Example 2 | 5.32 | 40% |
| Comparison Example 2 | 1.47 | 25% |

As shown in the table 3, the refractive index of the optical recording medium made by silicon is 5.32 with respect to the numerical aperture 1.81 of the objective lens, so that it becomes larger than the numerical aperture of the objective lens. On the other hand the refractive index of the optical recording medium made by a quartz glass is 1.47 with respect to the numerical aperture 1.81 of the objective lens, so that it becomes smaller than the numerical aperture of the objective lens.

From the comparison of the above practical example 2 and comparison example 2 it is clear that the quality of the reproduced signal is very much influenced by whether the value of the refractive index n of the optical recording medium is relatively large or small compared with the value of the numerical aperture NA.

Therefore, in this case, too, the relation between the numerical aperture NA of the objective lens and the refractive index n of the optical recording medium can be explained using the patterns from the objective lens as mentioned with respect to FIGS. 3A and 3B.

Figure 18:
FIG. 18 is an explanatory diagram comparatively showing a pattern from an objective lens for one practical example of an optical recording medium.
Figure 19:
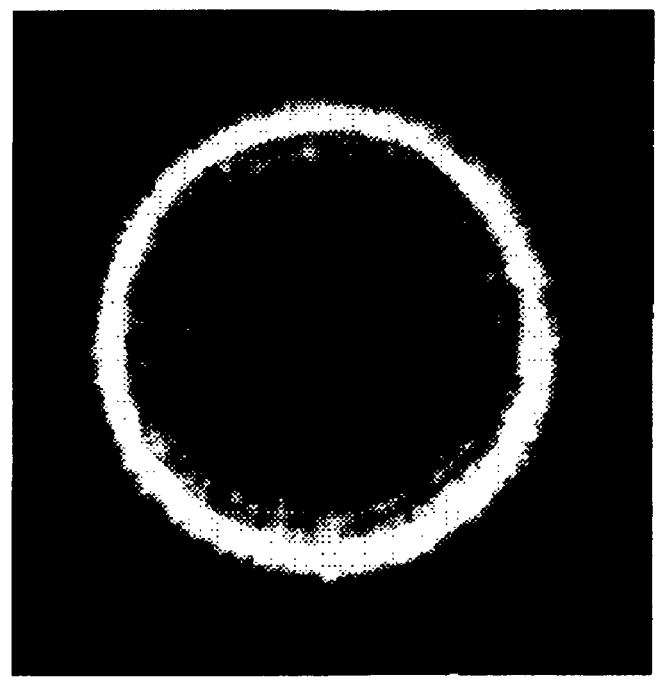
FIG. 19 is an explanatory diagram comparatively showing a pattern from an objective lens for a comparison example.

FIGS. 18 and 19 respectively show microscopic photographs of a pattern from the objective lens relating to the optical recording medium made by silicon according to the practical example 2 and of a pattern from the objective lens relating to the optical recording medium made by a quartz glass according to the comparison example 2 as mentioned above.

As shown in FIGS. 18 and 19, the pattern from the objective lens relating to the optical recording medium made by silicon is observed as a deep-black pattern while the pattern from the objective lens relating to the optical recording medium made by a quartz glass is observed having a white ring.

This white ring means a phenomenon caused by the fact that the numerical aperture NA of the objective lens is larger than the refractive index of the quartz glass, and as a result the numerical aperture NA of the objective lens is restricted to the refractive index of the quartz glass.

On the other hand, the deep-black pattern shown in FIG. 18 means a phenomenon caused by the fact that the numerical aperture NA of the objective lens is smaller than the refractive index of the silicon, and as a result it shows that the numerical aperture NA of the objective lens is not restricted to the refractive index of the silicon.

Therefore, for the optical recording medium according to the present invention, the numerical aperture is not restricted, so that it can propose an optical recording medium and an optical recording/reproducing method of a high density and a large capacity with more favorable reproducing characteristics.

In the above practical example 2 it was explained about a case where the optical recording medium is constituted as one-body using a single-crystal silicon, but it should be noted that good reproducing characteristics could also be obtained when another material of SiC or a high refractive index glass is used for the optical recording medium constituted for the reproduction-only type where recording pits are formed by concaves and convexes in such a way.

Figure 20:
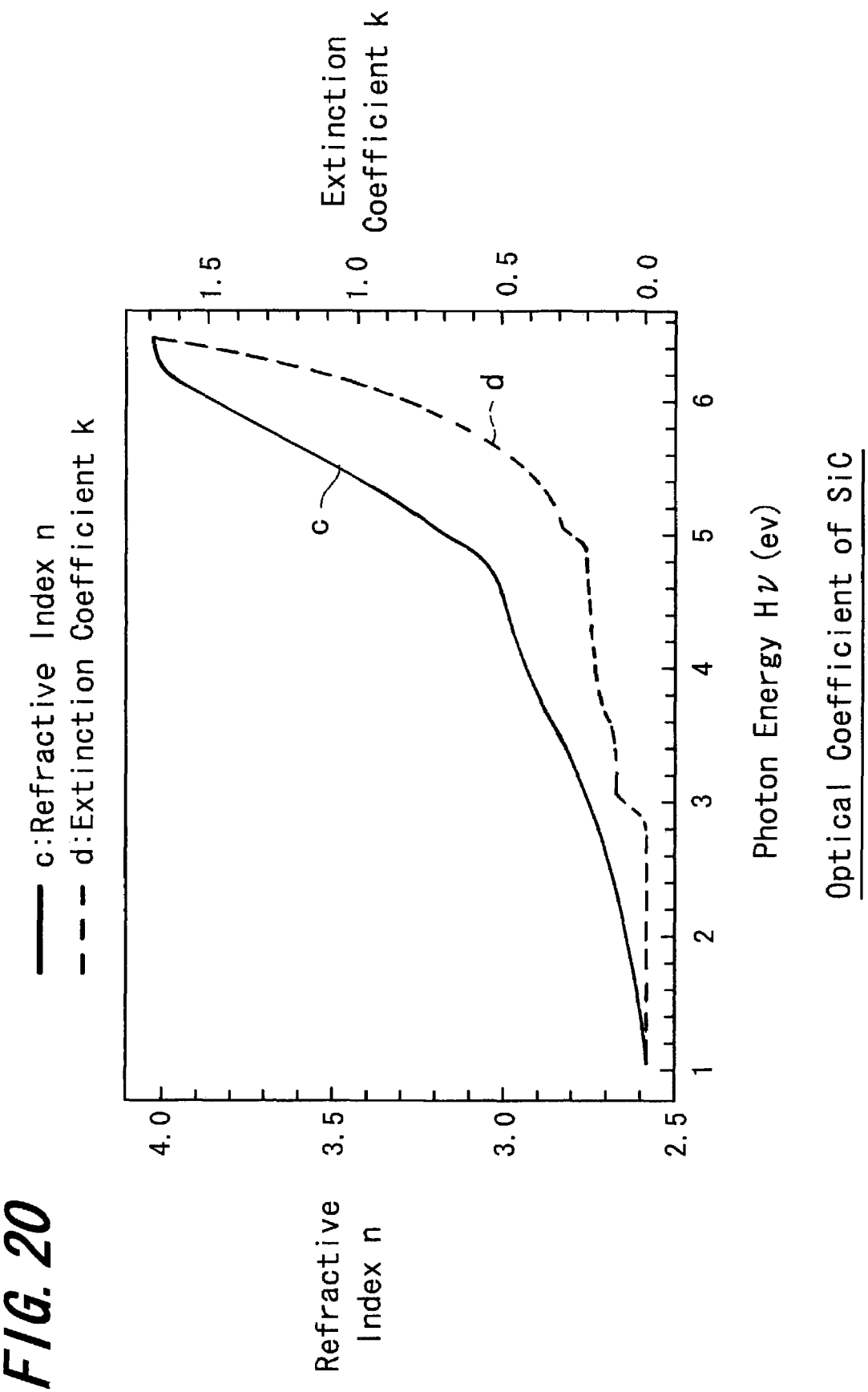
FIG. 20 is a diagram showing an optical characteristic of SiC.

FIG. 20 shows an optical characteristic of SiC. In FIG. 20 a solid line c shows a refractive index and a broken line d shows an extinction coefficient. As clear from FIG. 20, the refractive index can be large enough such as equal to or more than 2.5 in a region of the short wavelength when at least the recording portion is made by SiC, so that it can propose an optical recording medium to which a good optical recording/reproducing according to the near-field system is possibly applied.

It is needless to say that the optical recording medium according to the present invention is not restricted to the practical examples explained relating to each practical examples mentioned above and various modifications and changes could be applied thereto without departing from the scope of the present invention.

As mentioned above, according to the optical recording medium and the optical recording/reproducing method it becomes possible to realize a numerical aperture which was over the limit for the conventional optical recording medium of a small refractive index by selecting the refractive index n of at least the recording portion provided at the outer most surface of the optical recording medium relative to the numerical aperture NA of the objective lens as a relation of $n \geq NA$, by irradiating a light through the objective lens and by reproducing with respect to the optical recording medium.

Additionally, according to the optical recording medium of the present invention, an optical recording medium for reproduction-only can be constituted by forming concaves and convexes provided in advance in response to the recording information and made as recording pits.

Further, according to the present invention it can propose an optical recording medium and an optical recording/reproducing method capable of a high density recording with a lower cost by constituting the optical recording medium with the same material including the recoding portion to form a one-body constitution such that the manufacturing process can be simpler and the total cost can be lower.

Further, according to the present invention it can propose a large capacity optical recording medium from which a certainly good reproducing characteristics can be obtained and an optical recording/reproducing method capable of a high density recording by constituting the material of at least the recording portion with, for example, silicon or a high refractive index glass which has a high refractive index.

Further, when concaves and convexes are formed as recording pits in advance, it can propose a reproduction-only optical recording medium of a high density and a large capacity by constituting at least the recording portion with, for example, Si, SiC or a high refractive index glass.

In this case especially, when a one-body constitution of the substrate and the recording portion is adopted, pits can be recorded in the form of concaves and convexes such that an optical recording medium can be formed thereby, and therefore, it can realize an optical recording medium with a low cost and with little environment harmfulness.

Further according to the present invention, by selecting the thickness of an air layer between the objective lens and the optical recording medium equal to or less than 50 nm, it becomes possible to make the diameter of the light beam realized by the objective lens having a numerical aperture equal to or more than 1 smaller and at the same time it becomes possible to certainly perform a near-field optical recording/reproducing, so that it becomes possible to certainly realize an optical recording medium which can be of a high density and a large capacity, an optical recording/reproducing method thereof, an optical pickup-apparatus and an optical reproducing apparatus thereof.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. An optical reproducing method for reproducing an optical recording medium having recording pits at the outermost surface portion of the optical recording medium by irradiating light by means of an objective lens which has a numerical aperture equal to or more than 1, and thickness of an air layer between the objective lens and the outermost surface portion of the optical recording medium is equal to or less than 50 nm, wherein a relation $n \geq NA$ is selected where the refractive index of the outer most surface portion of the optical recording medium is n and the numerical aperture of the objective lens is NA;

and wherein the objective lens has a refractive index of greater than 2.0 for an irradiated light of from 200 to 500 nm that is applied during reproduction of data stored on the optical recording medium.

2. An optical reproducing method for reproducing an optical recording medium according to claim 1, wherein at least said recording portion is made by any material selected from Si, SiC and a high refractive index glass.

* * * * *